May 13, 1969     H. KRATOCHVIL     3,444,513

SCHOOL BUS FLASHER CIRCUIT

Filed May 25, 1967

INVENTOR
HARRY KRATOCHVIL
BY
Eyre, Mann, & Lucas
ATTORNEYS 3,444,513
SCHOOL BUS FLASHER CIRCUIT
Harry Kratochvil, Fords, N.J., assignor to Wagner Electric Corporation, a corporation of Delaware
Filed May 25, 1967, Ser. No. 641,294
Int. Cl. B60q 1/00, 1/38
U.S. Cl. 340—52     7 Claims

ABSTRACT OF THE DISCLOSURE

A flasher having a pair of contacts which open and close automatically is connected in series between a source of potential and the winding of a first relay. A second relay has its winding connected across the normally open pair of contacts of the first relay so that the contacts of the second relay are opened when the first relay is actuated. Two sets of signal lamps having distinctive colors are each arranged in two groups, all the lamps being connected through a door switch to the relay contacts and the source of electric power.

---

This invention relates to a flasher circuit which may be applied to a school bus for giving warning signals.

Regulations governing the operation of school buses frequently require that a first set of flashing lamps having a distinctive color, such as amber, be used to signal the identity of the bus when it is traveling on the road. When the door is opened and passengers are entering or leaving, other lamps must be flashed. These lamps are generally red in color and must be visible from both the front and rear of the vehicle. When the door is closed, current is switched to the amber lamps to denote the vehicle is under way.

The signal equipment on present school buses is generally expensive and more circuit components are used than is necessary. Also, some systems require the driver of the vehicle to turn on and off the signal lamps when a change is to be made, and this can be forgotten or overlooked. The present circuit described hereinafter is simple, inexpensive, and reliable. It is fully automatic and starts to work as soon as the ignition switch is turned on. A change is made from the amber flashing lamps to the red flashing lamps by a door switch which is operated by opening or closing the vehicle door.

The invention comprises a flasher which is connected in series between a source of potential, which may be a storage battery, and the winding of a first relay. The first relay includes a pair of normally open contacts which are connected across the winding of a second relay, also including a pair of normally open contacts. Two groups of signal lamps of a first color, which may be amber, are arranged for alternate flashing. Two groups of signal lamps of a second color, which may be red, are also arranged for alternate flashing when the vehicle door is open. All of the lamps have one of their terminals connected to one terminal of the power source, the other terminals being connected to the contacts of the door switch. The door switch is coupled to the contacts of the two relays.

For a better understanding of the present invention, reference is made to the following description taken in connection with the accompanying drawings.

Figure 1:
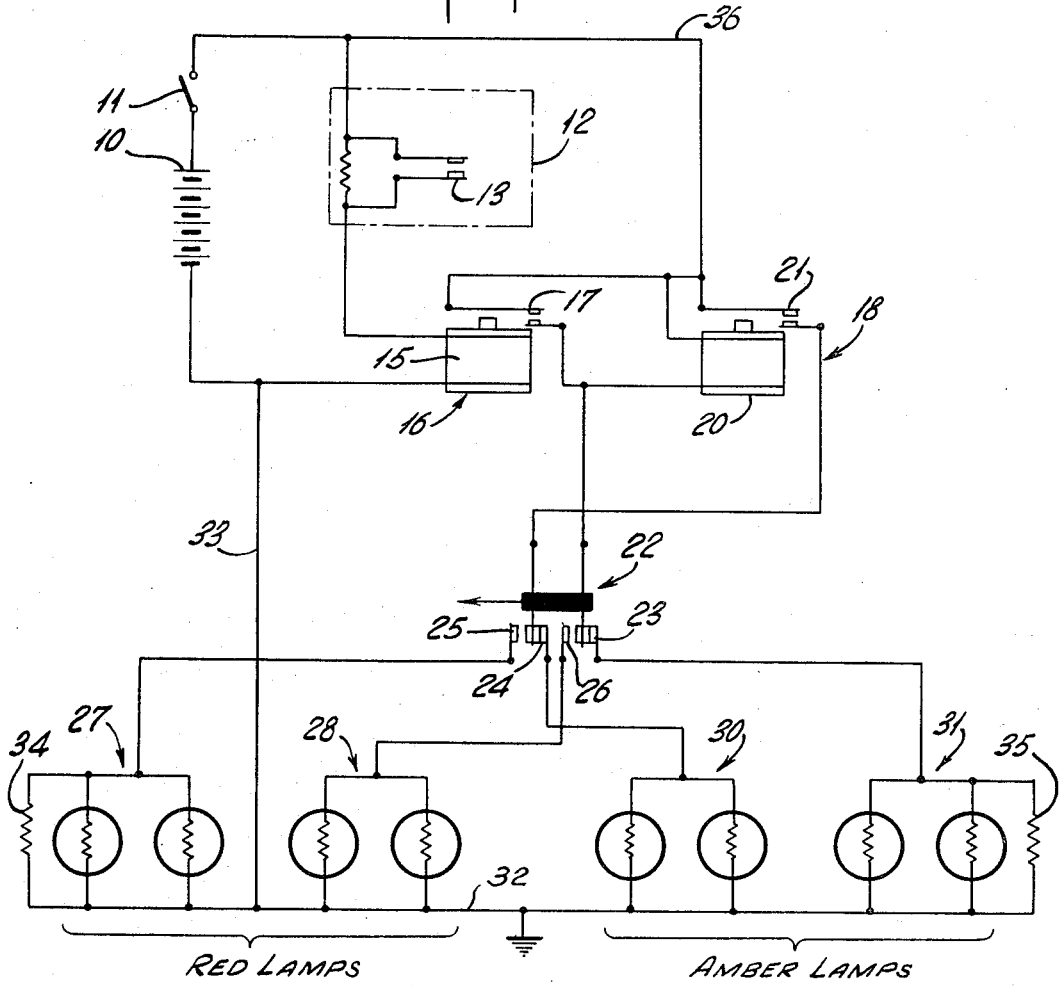
FIG. 1 is a schematic diagram of connections of the flasher circuit.

Referring now to FIG. 1, the flasher circuit includes a source of direct current electric power 10, a manually operated main switch 11 and a flasher circuit 12. The flasher circuit 12 includes a pair of contacts 13 and some type of mechanism such as a heater unit 14 for opening and closing the contacts. Many types of flashers have been designed and used, generally for flashing turn signal lamps for automobiles. Any of these flasher units can be used in this circuit. One terminal of the flasher unit 12 is connected to one of the terminals of switch 11 while the other flasher terminal is connected through a winding 15 to the other terminal of the battery 10. Winding 15 is part of a relay 16 having a pair of normally open contacts 17. Thus, whenever contacts 13 are closed, current flows through winding 15 and closes contacts 17.

A second relay 18 includes a winding 20 connected across the contacts 17 of winding 16. Relay 18 also includes a pair of normally open contacts 21, one of said contacts being connected between one terminal of winding 20 and one terminal of switch 11. A door switch 22 is mechanically connected to the door of the vehicle so that it is operated only by opening and closing the door. This switch includes two pairs of normally closed contacts 23 and 24 and two pairs of normally open contacts 25 and 26, and this position of the switch is assumed whenever the door of the bus is closed. When the door is opened, the switch 22 is operated to open contacts 23 and 24 and close contacts 25 and 26. The door switch 22 includes two moving blades one of which is connected to the stationary contact in relay 16 and the other of which is connected to the stationary contact in relay 18.

As shown in FIG. 1, the school bus is equipped with four red lamps arranged in two groups 27 and 28. Also, the vehicle is equipped with four amber lamps, also arranged in two groups 30 and 31. All the lamps have one terminal connected to a common conductor 32 which is grounded and which is connected to one terminal of the battery 10 by conductor 33. A resistor 34 is connected in parallel with the two lamps forming group 27 and a similar resistor 35 is connected in parallel with the two lamps forming group 31. These resistors, as will be explained later, are included in the circuit in case of failure of both of the lamps in groups 27 or 31.

The operation of this circuit is as follows: the circuit is started by the closure of switch 11 which may be part of the ignition switch. This action causes the flasher 12 to operate, opening and closing contacts 13 at a frequency of about one cycle of operations every second. When contacts 13 are closed, current flows through winding 15 and closes contacts 17, and when contacts 13 open, contacts 17 are opened. When contacts 17 are open, current flows from the battery, through switch 11, over conductor 36, through winding 20 thereby closing contacts 21 and sending current through closed contacts 24 to lamps 30 lighting them to show an amber signal. When the flasher contacts 13 are closed, the winding 15 of relay 16 is energized and contacts 17 are closed whereby winding 20 is deenergized and the contacts 21 are opened to extinguish lamps 30. At the same time, current flows from the battery through contacts 17, through door switch contact 23 to the amber lamps in group 31, lighting them for as long as the flasher contacts 13 are closed. When the flasher contacts 13 are opened, relay 16 is deenergized, extinguishing lamps 31, and current again flows to relay 18 to light the amber lamps in group 30. The flasher 12 continues to open and close contacts 13 and thereby switch current from the two groups of amber lamps. This action continues as long as the vehicle door is closed.

When the vehicle door is opened, contacts 23 and 24 are opened and contacts 25 and 26 are closed, thereby switching the current pulses from contacts 17 and 21 to groups 27 and 28 which are the red signal lamps. The action and operation of relays 16 and 18 are the same as before except the red lamps are flashed alternately instead of the amber lamps.

It should be noted that a short circuiting current must pass through contacts 17 when they are closed in order to disable the second relay 18 and conversely, when contacts 17 are open a current must pass through winding 20 in order to close contacts 21. If the lamps in group 27 or 31 should burn out this current will be cut off, and for this reason resistors 34 and 35 have been added in parallel to the lamps in groups 27 and 31 in order to maintain current in these branches so that the other lamps will keep flashing.

Figure 2:
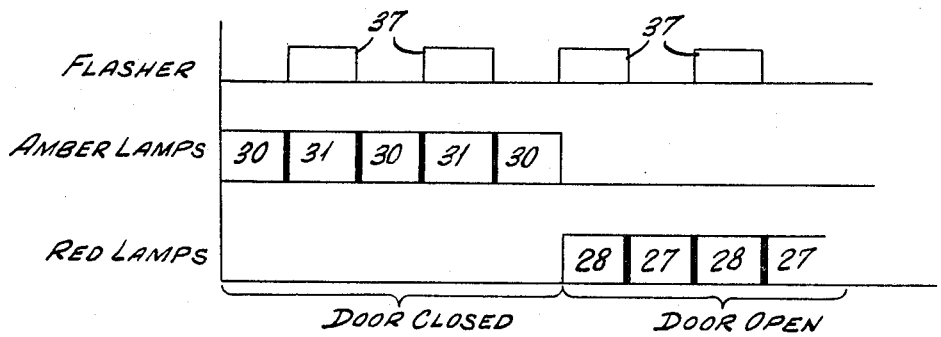
FIG. 2 is a graph indicating the method of flashing the two groups of lamps.

The graph shown in FIG. 2 illustrates the operation of the device with the current pulses 37 denoting the current through the flasher 12 when the contacts 13 thereof are closed. When the door is closed the amber lamps 30 and 31 are flashed in alternate sequence, and when the door is open lamps 27 and 28 are alternately lighted.

What is claimed is:

1. A flasher circuit for selectively flashing one or the other of two sets of signal lamps comprising, a source of direct current power, a flasher connected to the source for automatically opening and closing a pair of contacts, a first set of signal lamps composed of at least two lamps, a second set of signal lamps composed of at least two lamps, all of said lamps having one terminal connected to the power source, a first relay having a first pair of normally open contacts and a winding connected in series with the flasher and the power source, a second relay having a second pair of normally open contacts and a winding connected across said first pair of contacts, said relay combination for providing current to said sets of lamps, and a two-position switch having in one position two pairs of normally closed contacts and two pairs of normally open contacts and having in the other position the opposite connections in said contact pairs, said switch contacts being coupled between the relay contacts and said sets of signal lamps, whereby in said one switch position the lamps in said first set are alternately flashed while said second lamp set remains extinguished and in said other switch position the lamps in said second set are alternately flashed while said first set remains extinguished.

2. A flasher circuit as in claim 1 wherein said relay contacts each have one contact point connected to the junction between the flasher and power source.

3. A flasher circuit as in claim 1 wherein the contacts of the first relay are connected across the winding of the second relay for short circuiting the winding and disabling the second relay.

4. A flasher circuit as in claim 1 wherein each said set of lamps is composed of two pairs of lamps whereby said pairs in one lamp set are alternately flashed as pairs while the other lamp set remains extinguished and vice versa.

5. A flasher circuit as in claim 4 wherein the lamps of one lamp set all have the same color and the lamps of the other lamp set all have another color which is different from said first color.

6. A flasher circuit as in claim 1 wherein said two-position switch is operated by closing and opening of a door.

7. A flasher circuit as in claim 1 which includes a resistor connected in parallel with each lamp in said first and second lamp sets which is energized by the current pulses passing through said second pair of contacts of said second relay.

References Cited

UNITED STATES PATENTS

| | | | |
|---|---|---|---|
| 3,002,127 | 9/1961 | Grontkowski | 340—81 X |
| 3,182,289 | 5/1965 | Rossi | 340—83 |
| 3,271,621 | 9/1966 | McDermott | 340—83 X |

JOHN W. CALDWELL, *Primary Examiner.*

K. N. LEIMER, *Assistant Examiner.*

U.S. Cl. X.R.

340—66, 72, 83, 274